(12) United States Patent
Borsboom et al.

(10) Patent No.: US 9,260,307 B2
(45) Date of Patent: Feb. 16, 2016

(54) CATALYTIC SULFUR DEGASSING

(75) Inventors: Hans Borsboom, Leiden (NL); Anne Van Warners, Leiden (NL); Sander Kobussen, Leiden (NL)

(73) Assignee: Jacobs Nederland B.V. (NL)

( * ) Notice: Subject to any disclaimer, the term of this patent is extended or adjusted under 35 U.S.C. 154(b) by 157 days.

(21) Appl. No.: 14/128,124

(22) PCT Filed: Jun. 21, 2012

(86) PCT No.: PCT/NL2012/050435
§ 371 (c)(1),
(2), (4) Date: Jan. 29, 2014

(87) PCT Pub. No.: WO2013/006040
PCT Pub. Date: Jan. 10, 2013

(65) Prior Publication Data
US 2015/0259205 A1    Sep. 17, 2015

(30) Foreign Application Priority Data

Jun. 21, 2011  (NL) .................................. 2006980

(51) Int. Cl.
| | | |
|---|---|---|
| *B01J 8/00* | (2006.01) | |
| *C01B 17/90* | (2006.01) | |
| *C01B 17/02* | (2006.01) | |
| *C01C 1/02* | (2006.01) | |
| *B01J 19/24* | (2006.01) | |
| *B01J 19/30* | (2006.01) | |
| *B01J 19/32* | (2006.01) | |

(52) U.S. Cl.
CPC ............. *C01B 17/0232* (2013.01); *B01J 19/24* (2013.01); *B01J 19/30* (2013.01); *B01J 19/32* (2013.01); *C01C 1/024* (2013.01); *B01J 2219/24* (2013.01)

(58) Field of Classification Search
CPC ............................. C01B 17/0232; B01J 8/00

USPC ........................................... 423/578.1
See application file for complete search history.

(56) References Cited

U.S. PATENT DOCUMENTS

| | | | |
|---|---|---|---|
| 3,807,141 A * | 4/1974 | Estep et al. ............... | 96/181 |
| 4,537,605 A | 8/1985 | Gouw | |
| 4,729,887 A | 3/1988 | Pendergraft | |
| 5,080,695 A * | 1/1992 | Kassarjian ............... | 95/262 |
| 5,656,251 A | 8/1997 | Nagata et al. | |
| 7,081,233 B2 * | 7/2006 | Louie ..................... | 423/578.1 |

FOREIGN PATENT DOCUMENTS

| | | |
|---|---|---|
| EP | 0915055 A1 | 5/1999 |
| EP | 2347995 A1 | 7/2011 |
| GB | 1578230 A | 11/1980 |
| GB | 2203732 A | 10/1988 |
| JP | 3045505 A | 2/1991 |

OTHER PUBLICATIONS

Yamada, N., et al.,"Purification of Crude Liquid Sulfur Containing Hydrogen Sulfide Andhydrogen Polysulfide" Chemical Abstracts, Mar. 6, 1989, pp. 188, vol. 110, No. 10, Chemical Abstracts Services.
Office Action issued for corresponding European Patent Application No. 12730699.1, dated Oct. 22, 2014.

* cited by examiner

*Primary Examiner* — Timothy Vanoy
(74) *Attorney, Agent, or Firm* — Banner & Witcoff, Ltd.

(57) ABSTRACT

The invention relates to an improved process and apparatus for degassing liquid sulfur. According to the invention liquid sulfur is contacted with a catalyst module with voidage of 60% or more, which results in catalytic decomposition of $H_2S_x$ to produce sulfur and $H_2S$, and stripping/removing the balance of the $H_2S$ from the sulfur by means of the stripping gas. The invention furthermore relates to an apparatus comprising a catalyst module having an open volume of at least 60% and means for contacting liquid sulfur with a stripping gas to carry out said process.

15 Claims, 4 Drawing Sheets

CATALYTIC SULFUR DEGASSING

RELATED APPLICATION DATA

This application is a National Stage Application under 35 U.S.C. 371 of co-pending PCT application PCT/NL2012/050435 designating the United States and filed Jun. 21, 2012; which claims the benefit of NL application number 2006980 and filed Jun. 21, 2011 each of which are hereby incorporated by reference in their entireties.

The invention relates to an improved process and apparatus for degassing liquid sulfur.

An important process for removing hazardous hydrogen sulfide ($H_2S$) from various waste gases, including gases produced during the refining of petroleum products, is known as the Claus process. It involves the following net reaction:

$$H_2S + \tfrac{1}{2}O_2 \rightarrow H_2O + S \tag{1}$$

Liquid sulfur produced from the Claus process typically contains about 200 to 500 ppm wt. $H_2S$, partially dissolved and partially present in the form of polysulfides ($H_2S_x$). The handling of the liquid sulfur produced by the plant using the Claus process can be troublesome. On a regular basis, fires and explosions have occurred during the storage and transport of liquid sulfur, because of the accumulation of toxic and highly flammable $H_2S$ gas.

The $H_2S$ gas is produced by the gradual decomposition of hydrogen polysulfides present in the liquid sulfur represented by the following equation:

$$H_2S_x \leftrightarrow H_2S + (x-1)S \tag{2}$$

where x is at least 5 (see U.S. Pat. No. 6,149,887 and Journal of Physical Chemistry, Vol 70, no.1 (1966), p. 234-238). The dissolved $H_2S$ then passes into the gas phase by physical desorption.

Consequently, to be successful, a degasification process must not only remove $H_2S$, but must also remove hydrogen polysulfides, to prevent the subsequent generation of additional $H_2S$.

The Shell process describes in Sulphur, 173 (1984) 36-37 the degassing of sulfur in a storage tank or sulfur pit equipped with stripping columns, where liquid sulfur is vigorously agitated by bubbling air therethrough at atmospheric pressure. The stripping columns are open at their tops and bottoms to allow the sulfur to circulate at a rate of a few hundred times per hour. The stripping air, together with an additional flow of sweep air, is then used as a low pressure sweep gas to displace the gases produced by the degasification process. The low pressure gases so produced are then fed to an incinerator where the $H_2S$ is oxidized to $SO_2$ and released to the atmosphere. Depending on the design, a liquid or gaseous catalyst, such as ammonia, ammonium thiosulfate, urea, morpholine, quinoline, or an alkanol amine may be added for accelerating the decomposition of the hydrogen polysulfide into $H_2S$.

In an alternative process, known as the SNEA process, also described in Sulphur, 173 (1984) 36-37, degassing takes place using two compartments and repeated circulation and spraying of the liquid sulfur into the sulfur pit. Release of dissolved $H_2S$ is achieved by spraying liquid sulfur through jets at a specific velocity. Ammonia, injected at the suction of the recirculation pump, is typically used as a catalyst. After the $H_2S$ gas is released, it is removed by a sweep gas and fed to an incinerator.

Both the stripping columns used in the Shell process and the circulation/spraying equipment used in the SNEA process are costly and require a large amount of space. Further, it is a disadvantage of both processes that they require the additional step of having to incinerate the $H_2S$ containing sweep gases. Both processes are also disadvantageously slow, requiring a relatively long retention time in the sulfur pit. For example, the Shell process typically requires the liquid sulfur to be recirculated through the stripping columns for about fourteen to about twenty-four hours, while the SNEA process typically requires the liquid sulfur to be recirculated through the spray jets for about twenty-four to about thirty hours.

Accordingly, there has existed a definite need for a degasification process that not only effectively reduces the $H_2S$ content of liquid sulfur, but is simple, requires a minimum amount of space, and is inexpensive. There has existed a further need for a process that takes a relatively short amount of retention time to achieve the desired liquid sulfur degasification. There has existed a still further need for a process that does not require incineration of the $H_2S$ gas released from the liquid sulfur.

U.S. Pat. No. 4,729,887 describes a three stage degassing process where liquid sulfur and a sparging gas flow together through a catalyst bed. The sparging gas is introduced into the area below the catalyst bed. The catalytic material used may be alumina or cobalt-molybdenum impregnated alumina. The process of U.S. Pat. No. 4,729,887 may reduce the hydrogen sulfide content of the liquid sulfur to a value of 15 ppm wt.

The disadvantage of the process of U.S. Pat. No. 4,729,887 is the large possibility of high attrition of the catalytic material which results in the production of fines, i.e. very small catalyst particles in the sulfur. Attrition is an undesired process which leads to loss and decrease in the reactivity of the catalyst, and changes in bulk properties of the product. A further disadvantage of this process is that the low void fraction of approximately 0.4 of the catalyst bed makes circulation of the sulfur difficult. This mixing is required to prevent feed sulfur containing polysulfides from bypassing the catalyst bed. A further disadvantage of this process is that it is unable to reduce the levels below 15 ppm wt., which is higher than the permitted standard of 10 ppm wt. $H_2S$ content.

U.S. Pat. No. 5,632,967 describes a process for degassing liquid sulfur under a pressure of at least about 40 psig. A stream of liquid sulfur containing polysulfides and $H_2S$ and a stream of an oxidizing gas are introduced into a vessel and brought into contact with each other. Depending on the design, the vessel may be loaded with a bed of Claus catalyst or a Claus-like catalyst such as titanium oxide. Typical residence times used are 30 minutes to produce degassed liquid sulfur containing less than about 30 ppm wt. total $H_2S$ content. Similarly to the Shell process, a liquid or gaseous catalyst, such as ammonia, ammonium thiosulfate, urea, morpholine, quinoline, or an alkanol amine may be added for accelerating the decomposition of the hydrogen polysulfide into $H_2S$.

A disadvantage of the process of U.S. Pat. No. 5,632,967 is that Claus catalysts are prone to attrition. A further disadvantage is that the stripping air has to be dried to prevent the production of sulfuric acid. Furthermore, the process is performed under pressure which makes the system more sensitive to corrosion from sulfuric acid.

GB-A-2 203 732 describes a process for refining crude liquid sulfur that uses a honeycomb catalyst in order to prevent attrition of the catalyst. However, the described Example of GB-A-2 203 732 mentions that a large residence time of 10 hours is required to reduce the polysulfide content to below 10 ppm wt. Further, in order to maximize the surface area, honeycomb catalysts typically have small channel diameters that hinder adequate circulation of the sulfur. GB-A-2 203 732 does not suggest that it is possible to degas crude liquid sulfur within a short residence time of the liquid sulfur in the apparatus, such as within a residence time of one hour. Other processes for removal of (poly) sulfides are described in GB-A-1 578 230 and JP-A-3045505. The present invention seeks to provide a process that is more efficient in removal of (poly)sulfides.

Figure 1:
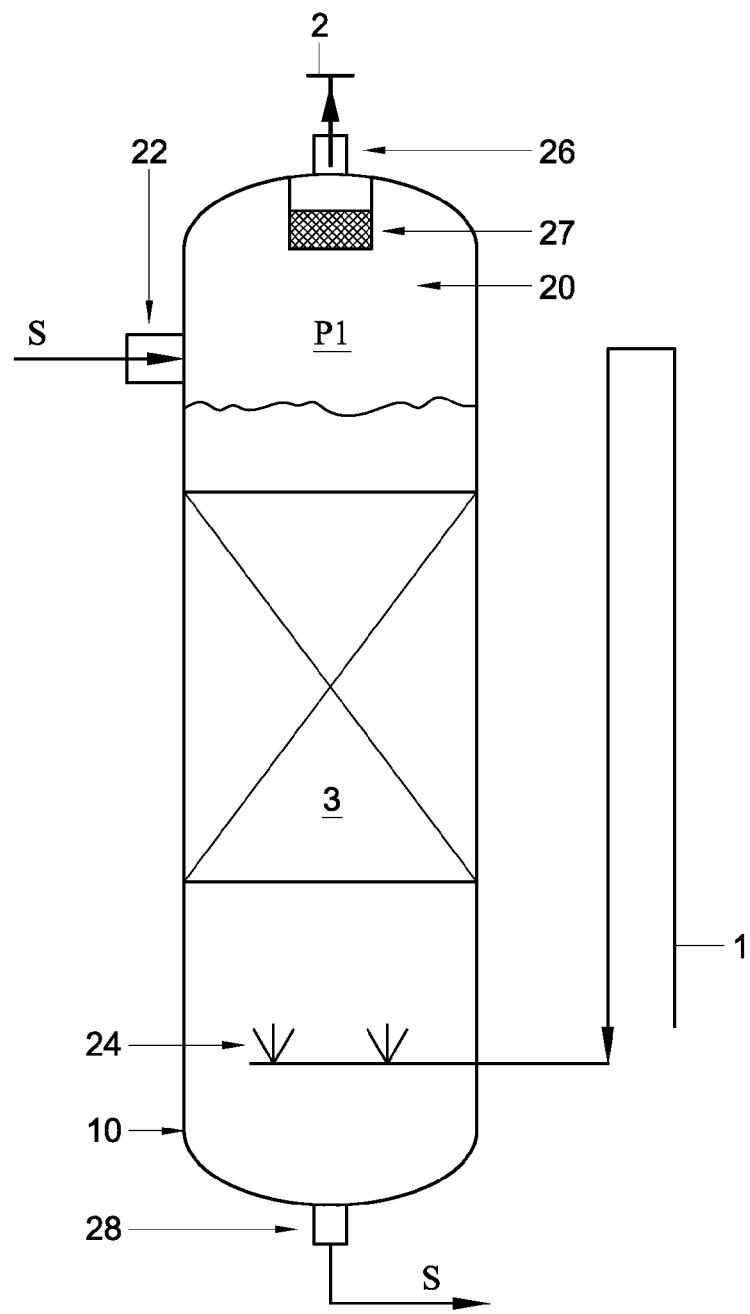
FIG. 1 schematically depicts an example single-pass configuration with a vertical degassing vessel.

An object of the present invention is to provide an improved process for degassing liquid sulfur, in particular the conversion of hydrogen polysulfides $H_2S_x$ to hydrogen sulfide and subsequent removal of hydrogen sulfide from said liquid sulfur. A further object of the present invention is to provide a process for degassing liquid sulfur with reduced attrition of the catalyst used. A further object of the present invention is to provide a process for degassing liquid sulfur that operates at a low pressure. A further object of the present invention is to provide a process for degassing liquid sulfur with a catalyst that due to its open structure allows an adequate circulation velocity and further allows countercurrent contacting of sulfur and stripping gas without resulting in flooding.

Accordingly the present invention is directed to a process for degassing liquid sulfur, which contains dissolved hydrogen sulfide and hydrogen polysulfides, comprising the step of contacting said liquid sulfur with a catalyst module, which is a structured catalyst or a random packing such as Raschig rings or Pall rings, while contacting said liquid sulfur with a stripping gas and wherein the voidage of said catalyst module is 60% or more.

The present inventors found that using a packed bed of catalyst particles does not result in the desired operation, in particular because it results in pressure drops that are too high. Even if a packed bed with a very high voidage could be obtained, which is normally not the case, since typically solid particles used as catalyst material result in a voidage of around 40% or even less, the tortuosity of such a packed bed would still result in a pressure drop that is too high. For this reason the present invention uses a catalyst module that is not a packed bed.

Degassing is preferably carried out as a continuous process in a dedicated vessel. The actual degassing takes place in the stripping column where sulfur is vigorously agitated by bubbling stripping gas through the liquid sulfur. The liquid sulfur and stripping gas are introduced into the vessel under pressure and mixed. The liquid sulfur is circulated within the vessel by means of a gas lift action exerted by the stripping gas. The mixture is then passed through the vessel at a pressure of typically less than 2.5 barg, preferably between about 0.5-1.2 barg, at a temperature of typically 125-155° C. and for a residence time sufficient to remove substantially all of the hydrogen polysulfides and hydrogen sulfide from the liquid sulfur. Preferably the vessel is a vertical vessel.

The process of the present invention removes $H_2S$ and $H_2S_x$ through two mechanisms: 1) catalytic decomposition of the $H_2S_x$ to produce sulfur and $H_2S$ (reaction (2) above), and 2) stripping/removing the balance of the $H_2S$ from the sulfur by means of the stripping gas. The upward flow of gas provides both agitation of the sulfur and stripping of $H_2S$.

The stripping gas suitable to be used in the process of the present invention includes air, nitrogen, a mixture of nitrogen and oxygen, carbon dioxide, methane, water or a mixture thereof. Preferably the stripping gas is an inert gas, more preferably nitrogen. The term "inert gas" refers to a gas that has no substantial reactivity to the components present in the process, in particular not to sulfur, not to (poly)sulfides, and not to $H_2S$. With "no substantial reactivity" is meant that reactivity of these components is about zero, viz. the concentration of any reaction products formed from any reaction between the inert gas and the components of the process is always smaller than 1 wt. %, typically smaller than 0.1 wt. %.

By using an inert gas, preferably nitrogen, the vent gas was found to be inherently safe, i.e. explosion by reaction of $H_2S$ with oxygen in any proportion is prevented. In addition the vent gas was also found to be much less corrosive. This is believed to result from the fact that using an inert gas such as $N_2$, less $SO_2$ and $H_2O$ are formed, as compared with prior art processes that use air. This in turn results in much less formation of aqueous sulfurous acid ($H_2SO_3$). Surprisingly, these advantages were found to outweigh the disadvantage that results from the somewhat slower reaction of $H_2S_x$ in the presence of $N_2$ instead of air.

Preferably the stripping gas is supplied by means of one or more sparger holes (or spargers) into the vessel. More preferably the sparger holes are equally spaced within the vessel. The flow rate of the stripping gas is typically in the range of 10-220 kg gas/hour per ton/hour of liquid sulfur.

The catalyst module is typically a ceramic or metal material with a large surface area. Preferably the catalyst present on the surface of the catalyst module has Lewis-base, e.g. alkaline properties. The catalytically active material of the catalyst module may for instance comprise alumina, silica, base-washed soda glass, a Lewis-base catalyst, iron oxide or base-washed ceramics. Preferably the catalyst module is a commercial structured packing like Mellapak 250Y coated with a layer of alumina $Al_2O_3$. The thickness of this layer can range from 50 microns to a few millimeters.

The catalyst module typically has an open volume (voidage) of at least 60%, preferably at least 65%, more preferably at least 70% and even more preferably at least 71. Typically the voidage is 72-98%. The advantage of using catalyst module with a high open volume is that the effects of diffusion limitation of the liquid sulfur through the catalyst module are reduced. A further advantage is that the pressure drop across the catalyst module is also reduced, the advantage of which is e.g. adequate circulation rates of sulfur of about 0.5 cm/s-10 cm/s, preferably about 1 cm/s-5 cm/s and more preferably about 1 cm/s-2.5 cm/s, by the gas-lift effect when the stripping gas compartment is separated from the catalyst compartment.

Figure 2:
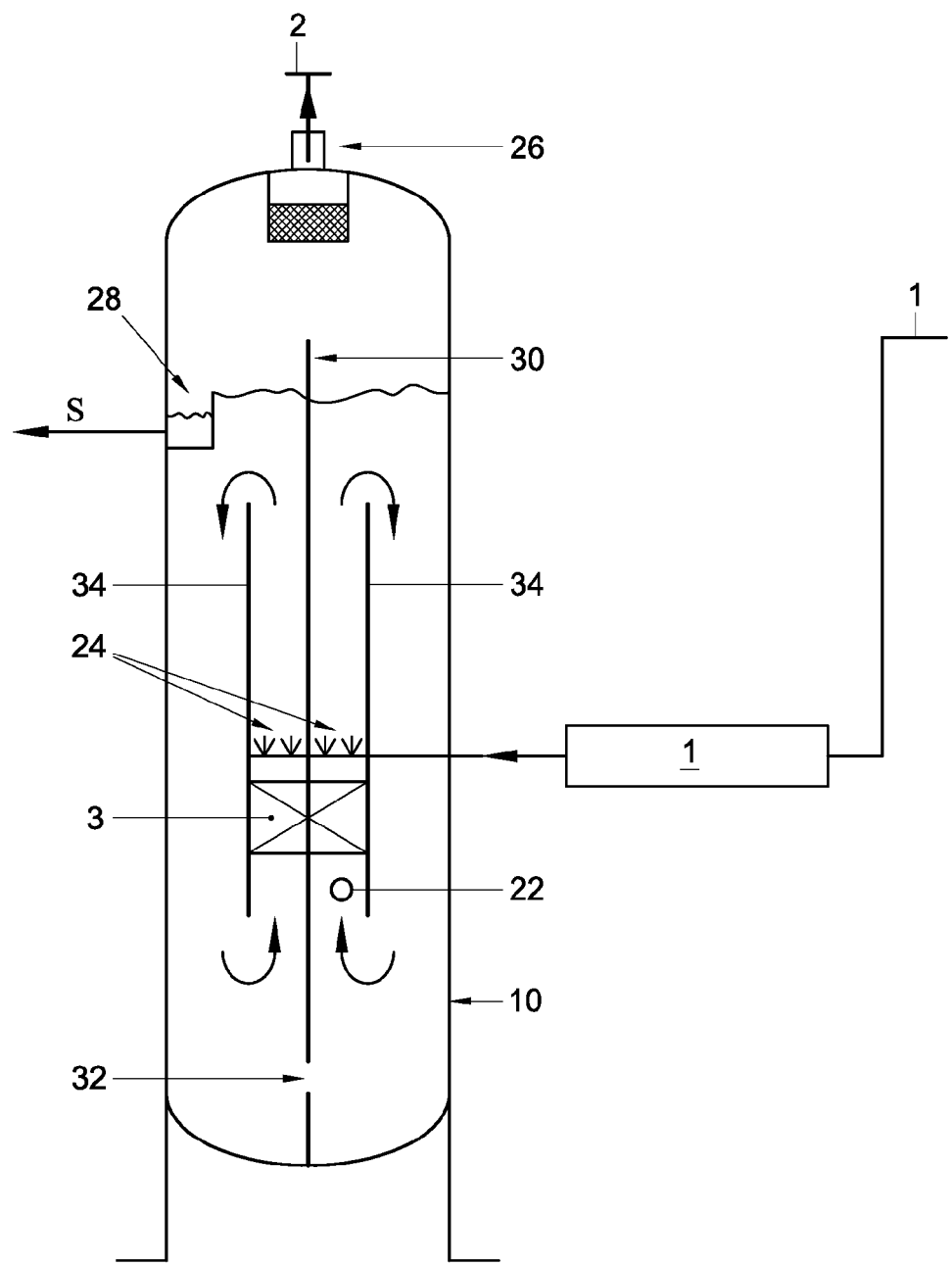
FIG. 2 schematically depicts an example recycle configuration with a vertical degassing vessel.

The process of the present invention can be carried out using different configurations, for instance a single-pass (or "once-trough") configuration, or in a recycle configuration, in which the sulfur is recirculated through catalyst, typically using the gas lift effect. Examples of the single-pass and recycle configuration are schematically depicted in FIGS. 1 and 2, respectively.

In accordance with the present invention the voidage, or open volume of the catalyst module should preferably be 60 vol. % or more.

Preferably the channels in said catalyst module have a minimal width of 5 mm, more preferably a minimal width of 8 mm.

It was found that a voidage of at least 60%, in particular in combination with the minimal channel widths mentioned above, result in optimal performance for both single-pass configuration and recycle configurations.

In a single-pass (FIG. 1) configuration attrition was found to be minimized by these parameters. Without wishing to be bound by theory, this is believed to result from the fact that so-called flooding, that is commonly encountered in counterflow fluidized beds, is avoided.

In the recycle configuration it was found important to have this relatively open structure in order to obtain the desired gas lifting effect. Also in this configuration a high space velocity of the sulfur is obtained with this open structure. This is advantageous, because although the equilibrium between $H_2S_x$ and $H_2S$ is reached relatively fast, it was found that if the sulfur remains for too long in the catalyst module it will be stripped for a limited number of passes, typically two or less time of the $H_2S$ formed. As a result the decomposition of $H_2S_x$ would be incomplete. A suitable volume for the catalyst module in the process of the present invention is typically about less than 2.0, preferably less than 1.0 m$^3$/100 t/d liquid sulfur.

The catalyst module may be in the form of a structured packing, a monolith, or random packing. Examples of random packings are Raschig rings or Pall rings. The outer surface area of the catalyst module is preferably about 200-400 m$^2$/m$^3$, more preferably 250-300 m$^2$/m$^3$.

Very suitable are metallic monoliths, for instance metallic monoliths based on calcined FeCrAlloy supports. These supports may be covered with catalytically active materials, e.g. perovskite catalysts as for instance described in Zhai et al. (Journal of Rare Earths 28(2010), p. 54-58).

The liquid hourly space velocity (LHSV) of the catalyst module is typically in the range of about 2-3, e.g. about 2.5 m$^3_{sulfur}$/m$^3_{catalyst}$/hour.

Preferably the sulfur flows in downward direction through the catalyst in order to minimize movement of the catalyst which might result in attrition. Thus attrition of the catalyst module is minimized.

The liquid sulfur and stripping gas are typically maintained at a pressure of less than 2.5 barg, preferably between about 0.5-1.2 barg and at a temperature from typically about 125° C. to about 155° C. within the vessel. The residence time is typically less than about one hour, preferably less than about 30 minutes and even more preferably less than about 20 minutes. In this way, the total $H_2S/H_2S_x$ content of the liquid sulfur may be reduced to less than 10 ppm wt. An advantage of the process of the present invention over that of U.S. Pat. No. 5,632,967 is that the addition of further chemical catalysts is not required to reduce the total $H_2S/H_2S_x$ content to such a low level.

In a preferred embodiment the stripping gas is introduced into the vessel such that it does not pass through the catalyst module. This is advantageous as it reduces the amount of attrition of the catalyst module.

In another embodiment of the process of the present invention the vessel comprises multiple compartments positioned within the vessel. This is particularly advantageous in reducing the residence time and the total $H_2S/H_2S_x$ content of the liquid sulfur. Another advantage is that the compartments can be put into operation after each other, thus permitting better control of the degassing process and prevent too rapid formation of $H_2S$, which allows for limiting the concentration of $H_2S$ in the gas leaving the vessel to well below the explosion limit of 3.4 vol %. A further advantage is that it is relatively simple to install a demister in the product stream. Furthermore, no expensive compressor is required but a simple blower suffices. Particular embodiments of the present invention are described below in considerable detail for the purpose of illustrating its principles and operation. However, various modifications may be made, and the scope of the invention is not limited to the exemplary embodiments described below. For example, while specific reference is made to liquid sulfur produced by a Claus plant, it will be appreciated that the process is of equal utility in degassing liquid sulfur containing hydrogen polysulfides and $H_2S$ produced from any source whatsoever.

In a preferred embodiment, a conventional packed bed or packed beds is/are placed above the injection point of the stripping gas (spargers), see for instance the empty space in FIG. 2 above the spargers 24, discussed below. This embodiment is advantageous because it was found that the gas-liquid mass transfer was improved. In this embodiment the conventional packing does not have to be catalytically active, which could be advantageous from a costs perspective. Preferably it is not catalytically active. Non-catalytically active packings are also more robust and less sensitive to attrition that could result from upward flow of the gas-liquid mixture lifting the packing elements. Typically these elements are 2.5-5 cm (in case of random packed particles), or 200 mm height and as wide as for instance the manhole providing access to the column (in case of blocks of structured packings).

In FIG. 1 there is shown schematically a vertically oriented degassing vessel 10 comprising one compartment and certain related equipment for use in the process in accordance with the present invention. The degassing vessel is made of any suitable material, such as carbon steel, that is essentially inert to oxidizing gases, liquid sulfur, and the like and that can withstand the required internal pressures, e.g. pressures in excess of from about 0.5 to about 5 barg, or greater.

Liquid sulfur from a sulfur recovery unit (SRU) containing physically dissolved $H_2S$ and $H_2S_x$ is introduced at a temperature typically ranging from about 125° C. to about 155° C. via inlet 22 at the top of the vessel 10. The liquid sulfur flows downwards and is brought in contact with a catalyst module 3 which is able to rapidly decompose the hydrogen polysulfides. The decomposed hydrogen polysulfides are stripped from the liquid sulfur with a stripping gas 1, in particular nitrogen, at a slightly elevated pressure. The stripping gas 1 is supplied and fed through spargers 24 at the bottom of the vessel 10. The pressure $P_1$ in the top of the vessel is typically about 2 barg or lower, which is sufficiently high to feed the product gas 2 through outlet 26 to the thermal stage (main burner) of an SRU. An optional demister 27 may be installed upstream of outlet 26. The degassed liquid sulfur exits the vessel 10 through outlet 28. The $H_2S$ concentration in the product liquid sulfur is typically less than 10 ppm wt. Since the stripping gas flows in upwards direction through catalyst module 3, some attrition may occur e.g. by lifting of the catalyst modules and therefore this embodiment is less preferred.

In FIG. 2 is shown schematically a vertically oriented degassing vessel 10 comprising two compartments divided by a baffle 30 to prevent short-circuiting. To maintain communicating vessels a drain hole 32 is installed at the bottom of the baffle 30. Liquid sulfur from a SRU containing physically dissolved $H_2S$ and $H_2S_x$ is introduced into the vessel 10 at a temperature typically ranging from about 125° C. to about 155° C. via inlet 22. The inlet 22 may be located anywhere, since the entire system is well mixed. In FIGS. 2 and 3 it is located at the bottom of the central part of the vessel 10. The liquid sulfur flows upwards when it is brought in contact with a catalyst module 3 which is able to rapidly decompose the hydrogen polysulfides, but downward flow is preferred. The formed free hydrogen sulfide is stripped from the liquid sulfur with a stripping 1 gas at a slightly elevated pressure. The stripping gas 1 is supplied and fed through spargers 24 positioned above the catalyst module 3. The stripping gas mixes with the liquid sulfur and the lower density of the mixture compared to that of sulfur at the outside of baffle 34 drives the circulation of the mixture through the vessel 10 over the degassing baffles 34. The degassed liquid sulfur exits the vessel 10 through outlet 28 and the product gas 2 through outlet 26.

The apparatus of FIG. 2 is preferably in the shape of a cylindrical set up, where catalyst module 3 may be for instance cylindrical in shape, placed in the centre. In a more preferred embodiment, however, the catalyst module is annular shape and placed so that it touches the inner walls of vessel 10. The sulfur then flows downward to the annulus of module 3 and subsequently upward through the center.

Figure 3A:
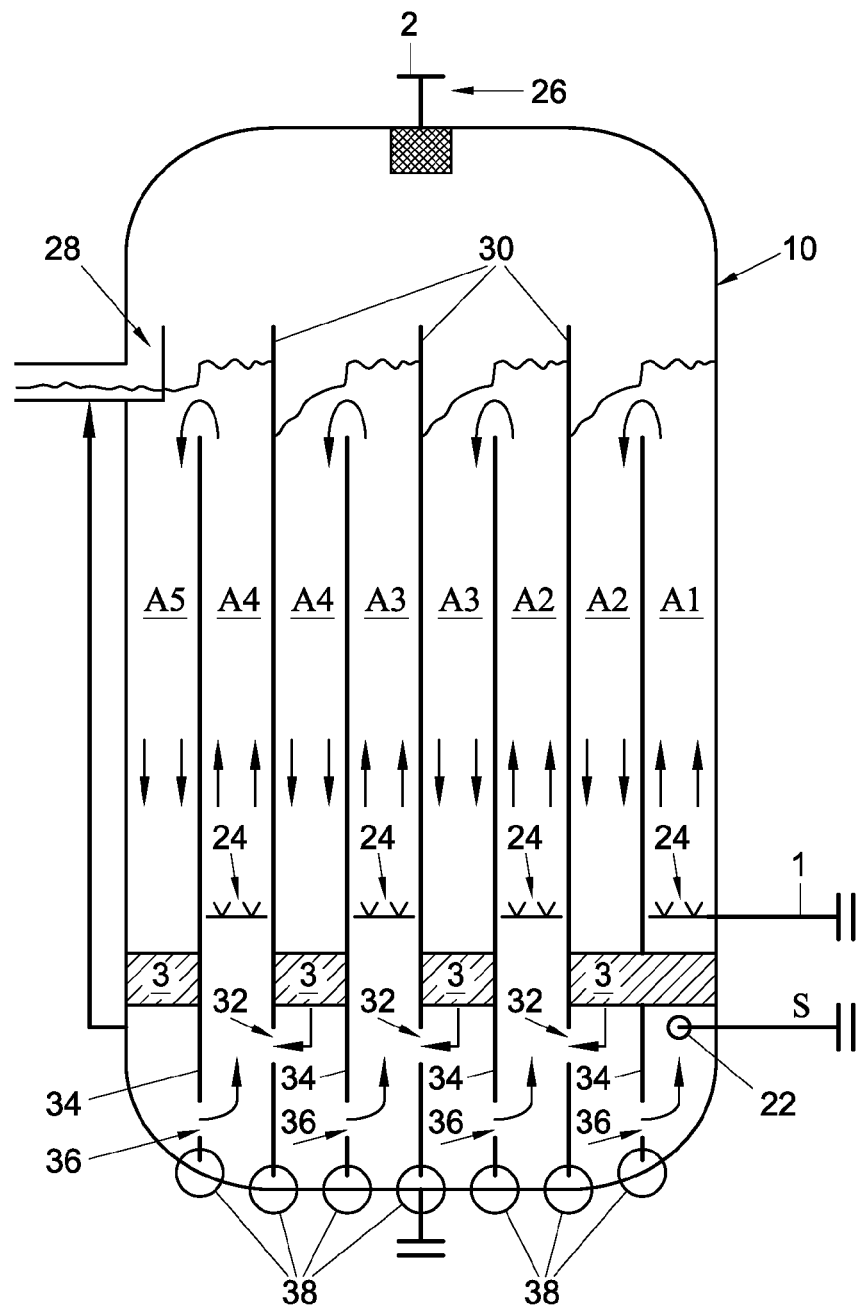
FIG. 3A schematically depicts a vertically oriented degassing vessel with five compartments.
Figure 3B:
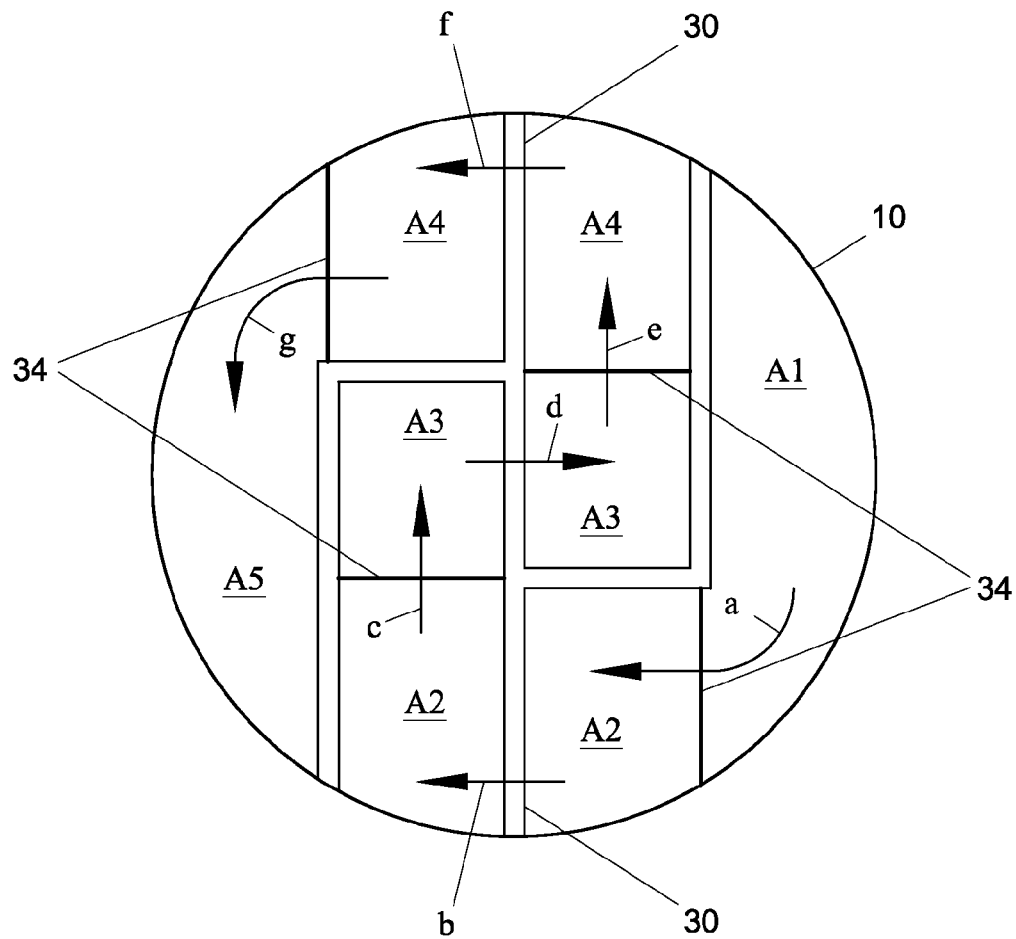
FIG. 3B schematically depicts an above view of a vertically oriented degassing vessel with five compartments.

In FIG. 3a is shown schematically a vertically oriented degassing vessel 10 comprising five compartments $A_1$-$A_5$ divided by baffles 30 with holes 32 at the bottom of the baffles 30. Liquid sulfur from a SRU containing physically dissolved $H_2S$ and $H_2S_x$ is introduced into the vessel at a temperature typically ranging from about 125° C. to about 155° C. via inlet 22. The inlet 22 is for instance located at the bottom of compartment $A_1$ of the vessel 10. The liquid sulfur flows downwards when it is brought in contact with a catalyst module 3, which is able to rapidly decompose the hydrogen polysulfides. The decomposed hydrogen polysulfides are stripped from the liquid sulfur with a stripping gas 1 at a slightly elevated pressure. The stripping gas is supplied at 1 and fed through spargers 24 positioned such that the stripping gas does not flow through the catalyst module 3. The stripping gas mixes with the liquid sulfur and drives the circulation of the mixture of the liquid sulfur through the five compartments in vessel 10 over the degassing baffles 34 and through the holes 36 at the bottom of the degassing baffles 34. The degassed liquid sulfur exits the vessel 10 through outlet 28 and the product gas 2 through outlet 26. Seven drainholes 38 are positioned at the bottom of vessel 10. The space inside the baffles 34 above the spargers 24 can be (partly) filled with conventional packing to increase the gas-liquid mass transfer and reduce the required vessel dimensions FIG. 3b shows schematically a view of the vessel 10 from above and the flow of the mixture of liquid sulfur and stripping gas through the five compartments $A_1$-$A_5$. Baffles and segments result in overflow and underflow, for instance as follows:

$A_1$ passes overflow to $A_2$ (left) at a;
$A_2$ passes underflow to $A_2$ (right) at b;
$A_2$ passes overflow to $A_3$ (left) at c;
$A_3$ passes underflow to $A_3$ (right) at d;
$A_3$ passes overflow to $A_4$ (right) at e;
$A_4$ passes underflow to $A_4$ (left) at f; and
$A_4$ passes overflow to $A_5$ at g.

In FIG. 3b baffles 30 do not allow overflow, while baffles 34 allow overflow. A similar construction is possible by dividing the top view area in several equal segment, preferably three or four equal segments.

As seen in FIGS. 1-3, the liquid sulfur and the stripping gas pass counter-currently through the vessel 10. In alternative embodiments, the two streams pass co-currently or in a cross flow.

EXAMPLE 1

This example illustrates a vertical vessel according to FIG. 1 receiving 4,167 kg/h liquid sulfur from a SRU containing 350 ppm wt. $H_2S$ (175 ppm wt. physically dissolved $H_2S$ and 175 ppm wt. $H_2S_x$) at a temperature of 140° C. The liquid sulfur flows downwards and is brought in contact with a catalytic active material which is able to rapidly decompose the hydrogen polysulfides. The decomposed hydrogen polysulfides are stripped from the liquid sulfur with a stripping gas or a gas mixture, which is preferably nitrogen at a slightly elevated pressure. The stripping gas is supplied through a sparger at the bottom of the vessel. The pressure $P_1$ in the top of the vessel is typically about 1 barg, which is sufficiently high to feed the product gas to the thermal stage (main burner) of the SRU. The vessel diameter is 600 mm, the contact time is typically about 30 minutes, the vessel height is 5,000 mm and the stripping gas flow rate is 104 kg/h. With this design, the $H_2S$ concentration in the product liquid sulfur is less than 10 ppm wt.

EXAMPLE 2

This example illustrates a sulfur recovery unit (SRU) with a capacity of 100 t/d sulfur production (4167 kg/h or 2.34 $m^3$/h) which is provided with a sulfur degassing vessel according to FIGS. 3a and 3b. The liquid sulfur contains 350 ppm wt. $H_2S$ in the form of physically dissolved $H_2S$ (175 ppm wt) and hydrogen polysulfides (175 ppm wt). The total amount of stripping nitrogen typically used is 208 kg/h, equally divided over five compartments $A_1$-$A_5$. The diameter of the vertical vessel is 2750 mm, the height of the degassing baffles 34 is 1750 mm and the vessel 10 height is 3050 mm. Using this design, the $H_2S$ concentration of the product liquid sulfur is reduced to less than 10 ppm wt.

The invention claimed is:

1. A process for degassing liquid sulfur, which contains dissolved hydrogen sulfide and hydrogen polysulfides, comprising the step of contacting said liquid sulfur with a catalyst module, while contacting said liquid sulfur with a stripping gas, wherein the voidage of said catalyst module is 60% or more, wherein the sulfur flows downwards through the catalyst module, and wherein the required residence time of the sulfur in the process to reduce polysulfide content to less than 10 ppm wt. is less than one hour, wherein said stripping gas is nitrogen, and which process is carried out at a pressure of less than 2.5 barg and at a temperature from about 125° C. to about 155° C.

2. The process according to claim 1, wherein the liquid sulfur is degassed in a vessel comprising more compartments.

3. The process according to claim 1, wherein the catalyst module comprises alumina, silica, based-washed soda glass, a Lewis-base catalyst, iron oxide or a base-washed ceramic.

4. The process according to claim 1, wherein the catalyst module is in the form of structured packing, a monolith or random packing.

5. The process according to claim 1, wherein said catalyst module is a random packing selected from Raschig rings, Pall rings or a combination thereof.

6. The process according to claim 1, wherein the catalyst module has an open volume of at least 65%.

7. The process according to claim 1, wherein the catalyst module comprises channels having a minimum width of 5 mm.

8. The process according to claim 1, wherein the catalyst module comprises channels having a minimum width of 8 mm.

9. The process according to claim 1, wherein the catalyst module comprises a FeCrAlloy support.

10. The process according to claim 1, which is carried out at a pressure of between about 0.5-1.2 barg.

11. The process according to claim 1, wherein direct contact between the stripping gas bubbles and the catalyst modules is minimized.

12. The process according to claim 1, wherein the contacting of liquid sulfur and stripping gas is improved by means of a packing, which is placed above spargers.

13. An apparatus for carrying out a process according to claim 1, comprising a vessel which contains means for feeding liquid sulfur, a catalyst module having an open volume of at least 60% and means for contacting said liquid sulfur with a stripping gas.

14. The apparatus according to claim 13, which comprises a vessel, a catalyst module, a feed for stripping gas, wherein the catalyst module is annular in cross-section and is in contact on its outer circumference with the inner circumference of vessel.

15. The apparatus according to claim 13, comprising a conventional packing, which is present in the inner circumference of vessel above spargers.

\* \* \* \* \*